(12) United States Patent
Takahashi et al.

(10) Patent No.: US 12,243,361 B2
(45) Date of Patent: Mar. 4, 2025

(54) MEASUREMENT DATA SYNCHRONIZATION METHOD, TESTING METHOD, AND NON-TRANSITORY COMPUTER-READABLE MEDIUM STORING COMPUTER PROGRAM

(71) Applicants: MEIDENSHA CORPORATION, Tokyo (JP); JAPAN AUTOMOBILE RESEARCH INSTITUTE, Tokyo (JP)

(72) Inventors: Toshimichi Takahashi, Tokyo (JP); Kenji Watanabe, Tokyo (JP); Tomoya Nakajo, Tsukuba (JP); Motoaki Oyama, Tsukuba (JP); Takahiro Haniu, Tsukuba (JP)

(73) Assignees: MEIDENSHA CORPRATION, Tokyo (JP); JAPAN AUTOMOBILE RESEARCH INSTITUTE, Tokyo (JP)

( * ) Notice: Subject to any disclaimer, the term of this patent is extended or adjusted under 35 U.S.C. 154(b) by 0 days.

(21) Appl. No.: 18/552,424

(22) PCT Filed: Mar. 14, 2022

(86) PCT No.: PCT/JP2022/011281
§ 371 (c)(1),
(2) Date: Sep. 25, 2023

(87) PCT Pub. No.: WO2022/202436
PCT Pub. Date: Sep. 29, 2022

(65) Prior Publication Data
US 2024/0177543 A1 May 30, 2024

(30) Foreign Application Priority Data
Mar. 24, 2021 (JP) .................................. 2021-050670

(51) Int. Cl.
*G06F 11/30* (2006.01)
*G01M 99/00* (2011.01)
(Continued)

(52) U.S. Cl.
CPC ......... *G07C 5/0808* (2013.01); *G01M 99/005* (2013.01); *G06F 16/27* (2019.01)

(58) Field of Classification Search
CPC .................................................... G07C 5/0808
See application file for complete search history.

(56) References Cited

U.S. PATENT DOCUMENTS

| 2017/0168033 A1* | 6/2017 | Yoshimura | .............. F01N 11/00 |
| 2018/0027515 A1* | 1/2018 | Tsuji | ...................... H04L 47/24 |
| | | | 709/232 |

FOREIGN PATENT DOCUMENTS

| JP | H2-83452 A | 3/1990 |
| JP | 2002-350304 A | 12/2002 |

(Continued)

*Primary Examiner* — Phuong Huynh
(74) *Attorney, Agent, or Firm* — Muncy, Geissler, Olds & Lowe, P.C.

(57) ABSTRACT

A measurement data synchronization method for synchronizing, through use of a data analysis apparatus, time series outputted from first through fifth measuring instruments, includes a step ST1 for acquiring first through fifth reference data outputted from the first through fifth measuring instruments when a reference signal including a stationary interval and a rising interval is inputted to the measuring instruments simultaneously, steps ST3-ST5 for generating first through fifth filter processed data by applying median filter processing to the first through fifth reference data to extract the median value in a prescribed duration, a step ST6 for calculating first through fifth rising times as timing information of rising from each of the first through fifth filter processed data, and a step ST7 for synchronizing first through fifth measurement data outputted from the measuring instruments on the basis of the first through fifth rising times.

5 Claims, 8 Drawing Sheets

(51) Int. Cl.
    *G06F 16/27* (2019.01)
    *G07C 5/08* (2006.01)

(56) References Cited

FOREIGN PATENT DOCUMENTS

| | | | |
|---|---|---|---|
| JP | 2015190861 A | * | 11/2015 |
| JP | 2015-228171 A | | 12/2015 |
| JP | 2017-111123 A | | 6/2017 |
| JP | 2018-13460 A | | 1/2018 |

* cited by examiner

CONVENTIONAL ART

MEASUREMENT DATA SYNCHRONIZATION METHOD, TESTING METHOD, AND NON-TRANSITORY COMPUTER-READABLE MEDIUM STORING COMPUTER PROGRAM

CROSS REFERENCE TO RELATED APPLICATIONS

This application is a National Stage Application of International Application No. PCT/JP2022/011281 filed on Mar. 14, 2022, which claims priority to Application No. 2021-050670 filed in Japan on Mar. 24, 2021, the entire contents of both of which are hereby incorporated by reference.

TECHNICAL FIELD

The present invention relates to a measurement data synchronization method, a test method, and a computer program. More specifically, the present invention relates to a measurement data synchronization method, a test method, and a computer program for synchronizing time series data outputted from a plurality of measuring instruments by a computer.

BACKGROUND ART

In recent years, development of electric vehicles that travel using electric energy, such as secondary battery electric vehicles, fuel cell vehicles, hybrid vehicles, and plug-in hybrid vehicles, has been actively progressing. The flow of energy in electric vehicles changes dramatically during travel. Therefore, the test for evaluating the performance of the electric vehicle requires more measuring instruments and the procedure is complicated as compared with the test of an internal combustion engine vehicle that runs only by the power generated in the internal combustion engine. For example, in a test of a hybrid vehicle, a plurality of measuring instruments for obtaining various data such as environmental information, speed, traveling distance, electric current, voltage, amount of electric power, and exhaust gas related data (exhaust gas concentration, exhaust gas flow rate, etc.) of the vehicle are used in combination.

In a test of an electric vehicle, the timings at which each measuring instrument is operated are different depending on the contents of the test. Many commonly used measuring instruments do not have a function of operating in synchronization with other measuring instruments. For this reason, in order to analyze a plurality of pieces of measurement data obtained by each measuring instrument by a computer, it is necessary to perform preprocessing for synchronizing the plurality of pieces of measurement data in advance. Conventionally, since such synchronization of measurement data has been manually performed by an operator, it takes a long time to perform the operation, and the test results may vary.]
Patent Document 1: Japanese Unexamined Patent Application, Publication No. 2015-190861

DISCLOSURE OF THE INVENTION

Problems to be Solved by the Invention

Figure 8:
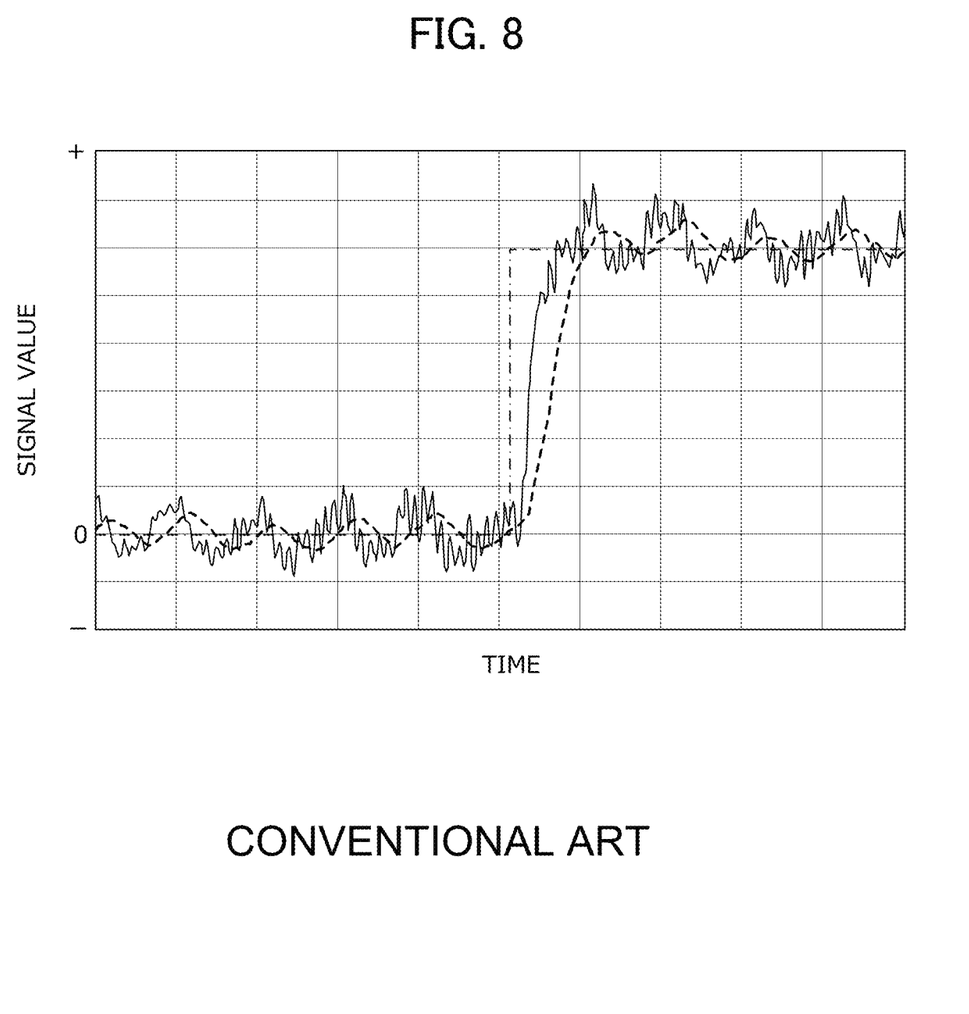
FIG. 8 is a diagram showing an example of an output of a measuring instrument when a step-shaped reference signal is input to the measuring instrument.

However, if a rising point of a signal such as that shown in FIG. 8 can be extracted from each measurement data which is one-dimensional time series data, each measurement data may be synchronized with the rising point as a reference.

FIG. 8 shows an example of an output (refer to a thin solid line) of the measuring instrument when a step-shaped reference signal (refer to a thin one dot chain line) is inputted to the measuring instrument. In FIG. 8, measurement data obtained by performing the processing shown in Patent Document 1 on the measurement data shown by the thin solid line is shown by the thick broken line.

As shown by a thin solid line in FIG. 8, since the measurement data of the measuring instrument generally includes harmonic noise and offset, the rising point cannot be accurately extracted. Therefore, as shown in Patent Document 1, it is conceivable to remove harmonic noise and offset from the measurement data by performing differential processing, integration processing, and harmonic removal processing using a low-pass filter on the measurement data. However, as shown by the thick broken line in FIG. 8, when a low-pass filter is applied to the measurement data and a high-frequency component is removed, the rising is delayed, and a rising point cannot be extracted accurately, and consequently, the measurement data cannot be synchronized accurately.

It is an object of the present invention to provide a measurement data synchronization method, a test method, and a computer program capable of accurately synchronizing time series data outputted from a plurality of measuring instruments.

Means for Solving the Problems (1) A measurement data synchronization method according to an embodiment of the present invention is directed to a method for synchronizing time series data outputted from a plurality of measuring instruments (for example, measuring instruments 31 to 35 described later) by a computer (for example, a data analysis apparatus 5 described later), the method including: acquiring reference data, which is time series data outputted from each measuring instrument, when a reference signal including a steady section and a rising section is simultaneously inputted to the plurality of measuring instruments; generating a plurality of pieces of filtered data by performing median filtering processing for extracting a median value within a predetermined time width on each of the plurality of pieces of reference data; acquiring rising timing information from each of the plurality of pieces of filtered data; and synchronizing time series data outputted from each of the plurality of measuring instruments based on a plurality of pieces of the rising timing information.

(2) In this case, it is preferable that generating the plurality of pieces of filtered data includes adjusting the time width so that a signal value included in the steady section of the plurality of pieces of filtered data falls within a predetermined range over an evaluation time.

(3) In this case, it is preferable that acquiring the reference data includes employing a signal that changes in a ramp shape in the rising section as the reference signal, and generating the plurality of pieces of filtered data includes performing the median filtering processing after performing differentiation processing on the reference data.

(4) In this case, it is preferable that acquiring the rising timing information includes acquiring a time when a signal value in each of the plurality of pieces of filtered data exceeds a predetermined threshold, as a rising time.

(5) In this case, it is preferable that acquiring the reference data includes employing a signal that changes in a ramp shape in the rising section as the reference signal, and acquiring the rising timing information includes calculating a slope and an intercept of a linear function generated based on a plurality of signal values included in the rising section of the plurality of pieces of filtered data and calculating a delay time of a rising portion of each of the plurality of pieces of filtered data based on the slope and the intercept.

(6) A test method according to an embodiment of the present invention is directed to a test method for evaluating a performance of an test object by processing time series data outputted from a plurality of measuring instruments (for example, measuring instruments 31 to 35 described later) by a computer (for example, a data analysis apparatus 5), the test method including: acquiring reference data, which is time series data outputted from each measuring instrument, when a reference signal including a steady section and a rising section is simultaneously inputted to a reference signal channel of each of the plurality of measuring instruments, and measurement data, which is time series data outputted from each measuring instrument, when a signal correlated with a state of the test object is inputted to each measuring channel of the plurality of measuring instruments; generating a plurality of pieces of filtered data by performing median filtering processing for extracting a median value within a predetermined time width on each of a plurality of pieces of the reference data; acquiring rising timing information from each of the plurality of pieces of filtered data; synchronizing a plurality of pieces of the measurement data based on a plurality of pieces of the rising timing information; and evaluating a performance of the test object based on the plurality of pieces of synchronized measurement data.

Effects of the Invention (1) An embodiment of the present invention is configured to acquire reference data, which is time series data outputted from each measuring instrument, when a reference signal including a steady section and a rising section is simultaneously inputted to the plurality of measuring instruments; generate a plurality of pieces of filtered data by performing median filtering processing for extracting a median value within a predetermined time width on each of the plurality of pieces of reference data; acquire rising timing information from each of the plurality of pieces of filtered data; and synchronize time series data outputted from each of the plurality of measuring instruments based on a plurality of pieces of the rising timing information. In particular, according to the embodiment of the present invention, it is possible to remove high-frequency noise without causing delay in rising of a signal included in the reference data by performing median filtering processing on each piece of reference data. Therefore, according to the embodiment of the present invention, since the rising timing information can be acquired accurately by using the filtered data generated through the median filter processing, it is possible to synchronize the time series data outputted from each measuring instrument accurately.

(2) According to an embodiment of the present invention, it is possible to appropriately remove sudden noise such as impulse noise without causing delay in rising by adjusting the time width in the median filtering processing so that the signal value included in the steady section of the filtered data falls within the predetermined range over the evaluation time, whereby it is possible to accurately synchronize the time series data of the measuring instrument.

(3) In an embodiment of the present invention, a signal that changes in a ramp shape in a rising section is used as a reference signal, and the reference data are subjected to differential processing, and then subjected to median filter processing to generate filtered data. As a result, the offset components included in the measurement data can be removed without causing a delay in rising of the measurement data of each measuring instrument, whereby it is possible to synchronize the time series data of the measuring instrument accurately.

(4) According to an embodiment of the present invention, it is possible to obtain the rising time by a simple arithmetic operation by obtaining a time when the signal value in the filtered data exceeds a predetermined threshold value as a rising time.

(5) In an embodiment of the present invention, a signal that changes in a ramp manner in a rising section is used as a reference signal, a slope and an intercept of a linear function generated based on a plurality of signal values included in a rising section of the filtered data are calculated, and a delay time of a rising section of the filtered data is calculated based on the slope and the intercept. According to the embodiment of the present invention, it is possible to synchronize the time series data of each measuring instrument more accurately by using the delay time of the rising portion calculated in this manner.

(6) An embodiment of the present invention is configured to acquire reference data, which is time series data outputted from each measuring instrument, when a reference signal including a steady section and a rising section is simultaneously inputted to a reference signal channel of each of the plurality of measuring instruments, and measurement data, which is time series data outputted from each measuring instrument, when a signal correlated with a state of the test object is inputted to each measuring channel of the plurality of measuring instruments. Further, the embodiment of the present invention is configured to generate a plurality of pieces of filtered data by performing median filtering processing on each of a plurality of pieces of the reference data; acquire rising timing information from each of the plurality of pieces of filtered data; synchronize a plurality of pieces of the measurement data based on a plurality of pieces of the rising timing information; and evaluate a performance of the test object based on the plurality of pieces of synchronized measurement data. In particular, according to the embodiment of the present invention, it is possible to remove high-frequency noise without causing delay in rising of a signal included in the reference data by performing median filtering processing on each piece of reference data. Therefore, according to the embodiment of the present invention, since the rising timing information can be acquired accurately by using the filtered data generated through the median filter processing, it is possible to synchronize the measurement data outputted from each measuring instrument accurately, whereby it is possible to evaluate the performance of the test object accurately.

PREFERRED MODE FOR CARRYING OUT THE INVENTION

First Embodiment

Figure 1:
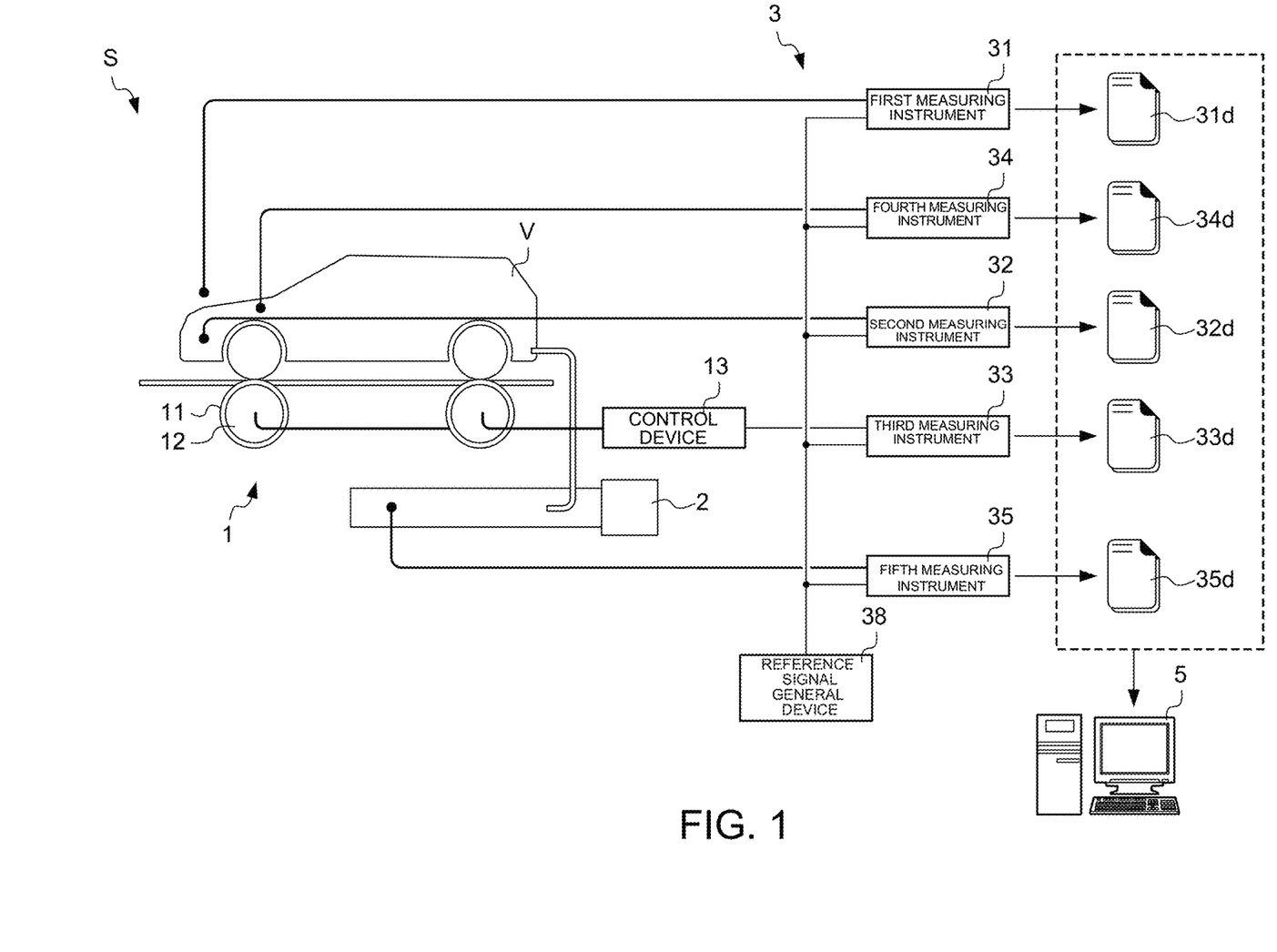
FIG. 1 is a diagram showing a configuration of a test system according to a first embodiment of the present invention.

Hereinafter, a first embodiment of the present invention will be described in detail with reference to the drawings. FIG. 1 is a diagram showing a configuration of a test system S to which a measurement data synchronization method and a test method according to the present embodiment are applied.

The test system S is an apparatus for evaluating performance of an electric vehicle V serving as a test object, such as a secondary battery electric vehicle, a fuel cell vehicle, a hybrid vehicle, or a plug-in hybrid vehicle, which travels using electric energy.

The test system S includes a chassis dynamometer system 1 on which the electric vehicle V is mounted, a dilution tunnel 2 through which exhaust gas discharged from an exhaust pipe of the electric vehicle V flows, a measuring instrument group 3 that generates various data based on detection signals of a plurality of sensors mounted in the electric vehicle V and in the vicinity of the electric vehicle V, a signal transmitted from the chassis dynamometer system 1, and the like, and a data analysis apparatus 5 that performs various calculations using the data generated by the measuring instrument group 3.

The chassis dynamometer system 1 includes a plurality of rollers 11 disposed below the electric vehicle V so as to contact the drive wheels of the electric vehicle V on the outer peripheral surface thereof, a plurality of dynamometers 12 connected to the rollers 11, and a control device 13 that controls the dynamometer 12 so as to apply an appropriate load to the electric vehicle V traveling on the rollers 11.

The driver of the electric vehicle V drives the electric vehicle V in accordance with a driving pattern (for example, a vehicle speed pattern) displayed on a driver's aid (not shown).

The measuring instrument group 3 includes a plurality of measuring instruments 31, 32, 33, 34, and 35 for measuring various physical quantities correlated with the state of the electric vehicle V during running, and a reference signal generation device 38 for generating a reference signal for synchronizing data measured by the measuring instruments 31 to 35. Each of the measuring instruments 31 to 35 is a multichannel measuring instrument having at least a measuring channel and a reference signal channel. The reference signal generation device 38 is connected to a reference signal channel of each of the measuring instruments 31 to 35. The reference signal generated by the reference signal generation device 38 is inputted to a reference signal channel of each of the measuring instruments 31 to 35.

The first measuring instrument 31 is a device for mainly measuring environmental information (for example, room temperature, humidity, wind speed, atmospheric pressure, etc.) of the electric vehicle V. Various sensors necessary for measuring the environmental information are connected to the measuring channel of the first measuring instrument 31. The first measuring instrument 31 outputs a first data file 31d including first reference data, which is time series data of a reference signal inputted to the reference signal channel, and first measurement data, which is time series data of environmental information generated based on an input signal to the measuring channel and is synchronized with the first reference data.

The second measuring instrument 32 is a device for mainly measuring electric power information (for example, electric current, voltage, amount of electric power, and the like) of the electric vehicle V and the external power source. Various sensors necessary for measuring the power information are connected to the measuring channel of the second measuring instrument 32. The second measuring instrument 32 outputs a second data file 32d including second reference data, which is time series data of a reference signal inputted to the reference signal channel, and second measurement data, which is time series data of electric power information generated based on an input signal to the measuring channel and is synchronized with the second reference data.

The third measuring instrument 33 is a device for mainly measuring travel information (for example, speed, travel distance, etc.) and exhaust gas information of the electric vehicle V. Various sensors necessary for measuring the control device 13 of the dynamometer system 1 and the exhaust gas information are connected to the measuring channel of the third measuring instrument 33. The third measuring instrument 33 outputs a third data file 33d including third reference data, which is time-series data of a reference signal inputted to the reference signal channel, and third measurement data, which is time-series data of traveling information and exhaust gas information generated based on an input signal to the measuring channel and is synchronized with the third reference data.

The fourth measuring instrument 34 is a device for mainly measuring monitor information (for example, SOC of a battery) monitored by a vehicle-mounted computer of the electric vehicle V. A measuring channel of the fourth measuring instrument 34 is connected to a vehicle-mounted computer of the electric vehicle V. The fourth measuring instrument 34 outputs a fourth data file 34d including fourth reference data, which is time-series data of a reference signal inputted to the reference signal channel, and fourth measurement data, which is time-series data of monitor information generated based on an input signal to the measuring channel and is synchronized with the fourth reference data.

The fifth measuring instrument 35 mainly measures exhaust gas information of the electric vehicle V. A sensor provided in the dilution tunnel 2 is connected to a measuring channel of the fifth measuring instrument 35. The fifth measuring instrument 35 outputs a fifth data file 35d including fifth reference data, which is time series data of a reference signal inputted to the reference signal channel, and fifth measurement data, which is time series data of exhaust gas information generated based on an input signal to the measuring channel and is synchronized with the fifth reference data.

The reference signal generation device 38 generates a reference signal including at least a steady section and a rising section according to an operation by the operator, and inputs the reference signal to the reference signal channels of the measuring instruments 31 to 35 at the same time. In the present embodiment, a case where the reference signal generation device 38 generates a reference signal in response to a manual operation by an operator will be described, but the present invention is not limited thereto. The reference signal generation device 38 may generate a reference signal in conjunction with the start signal of the driver's aid.

Figure 2A:
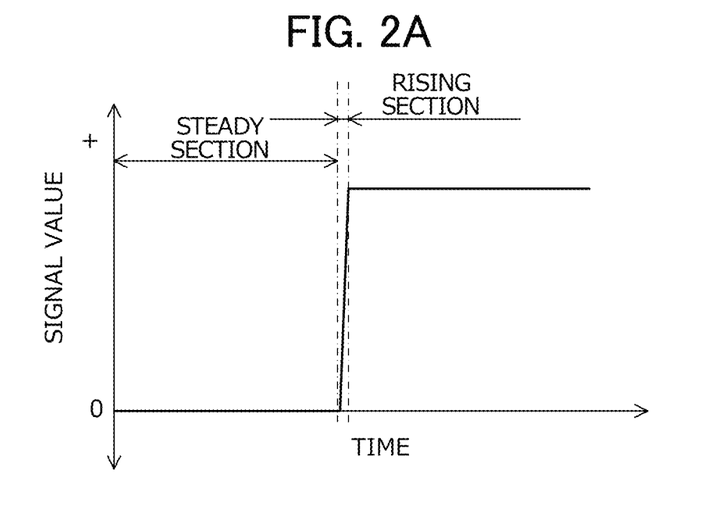
FIG. 2A is a diagram showing an example of a reference signal.
Figure 2B:
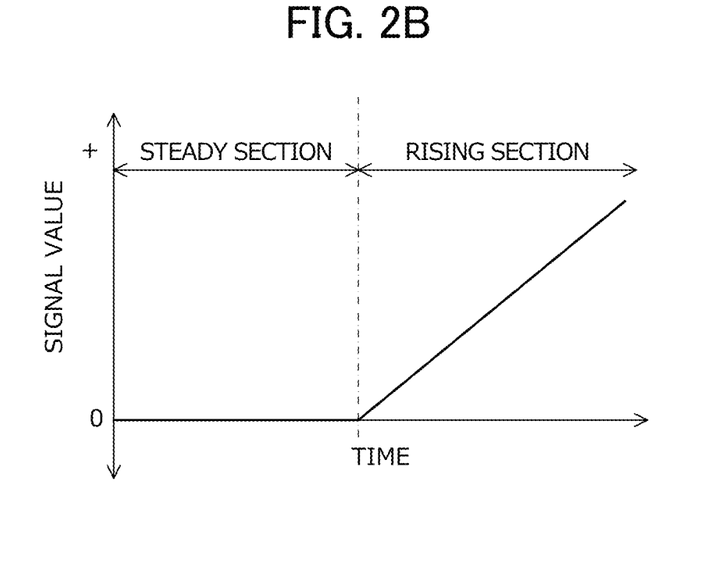
FIG. 2B is a diagram showing an example of a reference signal.

FIGS. 2A and 2B are diagrams each showing an example of a reference signal. FIG. 2A shows an example of a step-shaped change in the rising section, and FIG. 2B shows an example of a ramp-like change in the rising section.

Referring back to FIG. 1, the data analysis apparatus 5 is a computer that includes hardware such as an arithmetic processing means such as a CPU (Central Processing Unit), an auxiliary storage means such as a HDD (Hard Disk Drive) and SSD (Solid State Drive) for storing data files 31d to 35d and various programs, a main storage means such as RAM (Random Access Memory) for temporarily storing data necessary for the arithmetic processing means to execute a program, an operation means such as a keyboard for an operator to perform various operations, and a display means such as a display for displaying various information on the operator.

Figure 3:
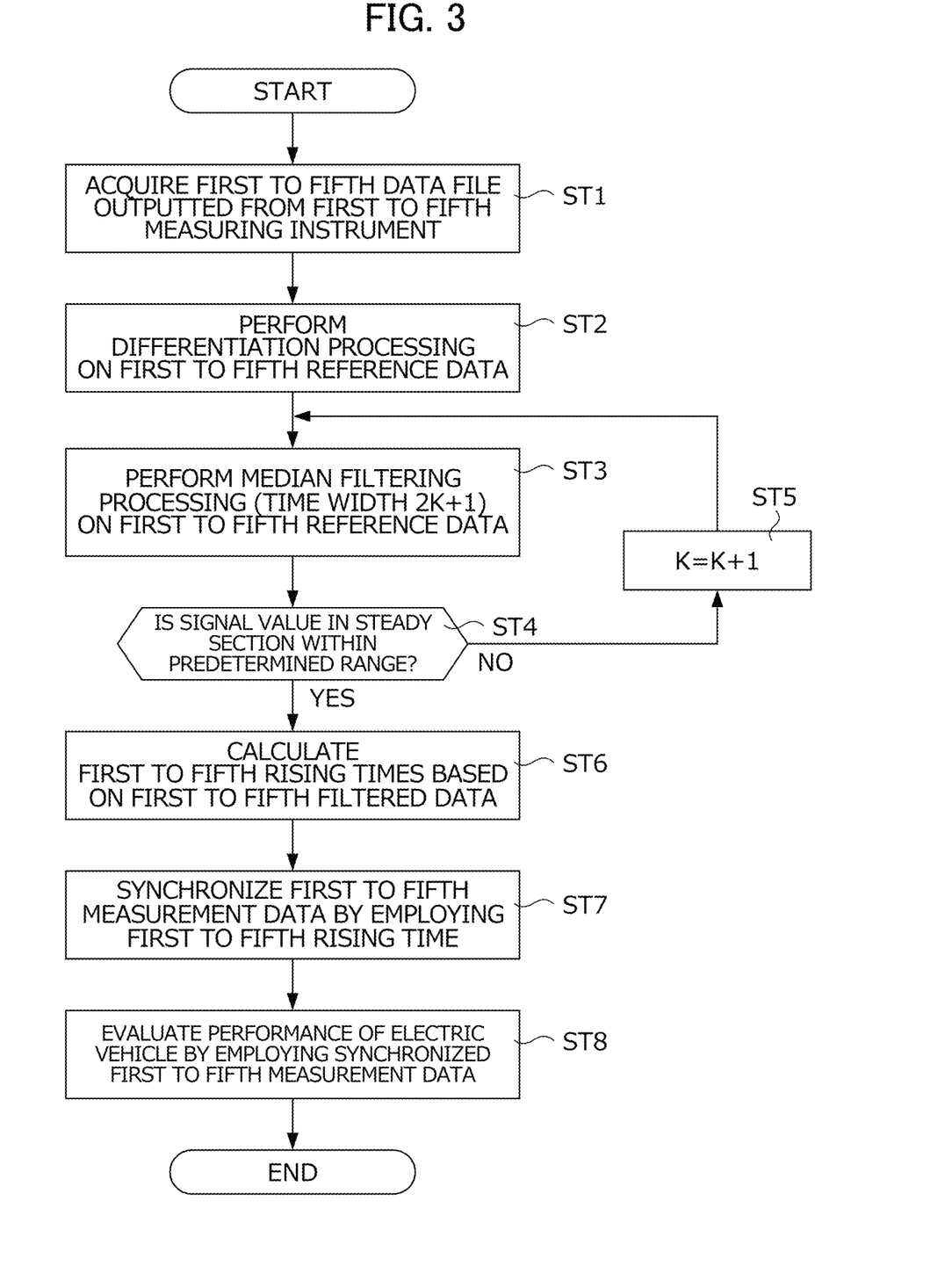
FIG. 3 is a flowchart showing a specific procedure of a measurement data synchronization method and a test method.

FIG. 3 is a flowchart showing a specific procedure of a measurement data synchronization method and a test method. Each step shown in the flowchart of FIG. 3 is implemented by executing a computer program installed in the data analysis apparatus.

First, in Step ST1, the data analysis apparatus acquires the first to fifth data files outputted from the first to fifth measuring instruments, and advances to Step ST2. As described above, each data file includes the reference data outputted from each measuring instrument when the reference signal is simultaneously inputted to the reference signal channels of the first to fifth measuring instruments, and the measurement data outputted from each measuring instrument when the signals correlated with the states of the electric vehicle are inputted to the measurement channels of the first to fifth measuring instruments. In the following description, as shown in FIG. 2B, a signal that changes in a ramp shape in a rising section is used as a reference signal.

Next, in Step ST2, the data analysis apparatus performs differentiation processing on the first to fifth reference data acquired in Step ST1, and advances to Step ST3. Thus, the offsets of the first to fifth reference data in the steady section are removed.

Next, in Step ST3, the data analysis device generates first to fifth filtered data by performing median filtering processing for extracting median values within a predetermined time width (2K+1) on the first to fifth reference data subjected to the differentiation processing in Step ST2, and advances to Step ST4.

Here, the median filtering processing is a process of extracting a median value (the K+1th largest value among x(n−K), . . . , x(n+K)) within a time width 2K+1 (K is an integer) with respect to a filter input x(n) which is one-dimensional time series data (n is an integer), and outputting a filter output y(n) which is one-dimensional time series data, as shown in the following Equation (1).

$$y(n)=\text{MED}[x(n-K),x(n-K+1),\ldots,x(n),\ldots,x(n+K)] \quad (1)$$

Next, in Step ST4, the data analysis apparatus determines whether or not the signal value included in the steady section of the first to fifth filtered data generated under the predetermined time width (2K+1) in Step ST3 falls within a range (refer to FIG. 4 described later) between the positive upper limit value and the negative lower limit value centered on the value 0 over a predetermined evaluation time. When the determination result in Step ST4 is NO, the data analysis apparatus increases the time width in the median filtering processing by counting up the value of the integer K (Step ST5), and then returns to Step ST3. When the determination result in Step ST4 is YES, the data analysis apparatus advances to Step ST6.

Figure 4:
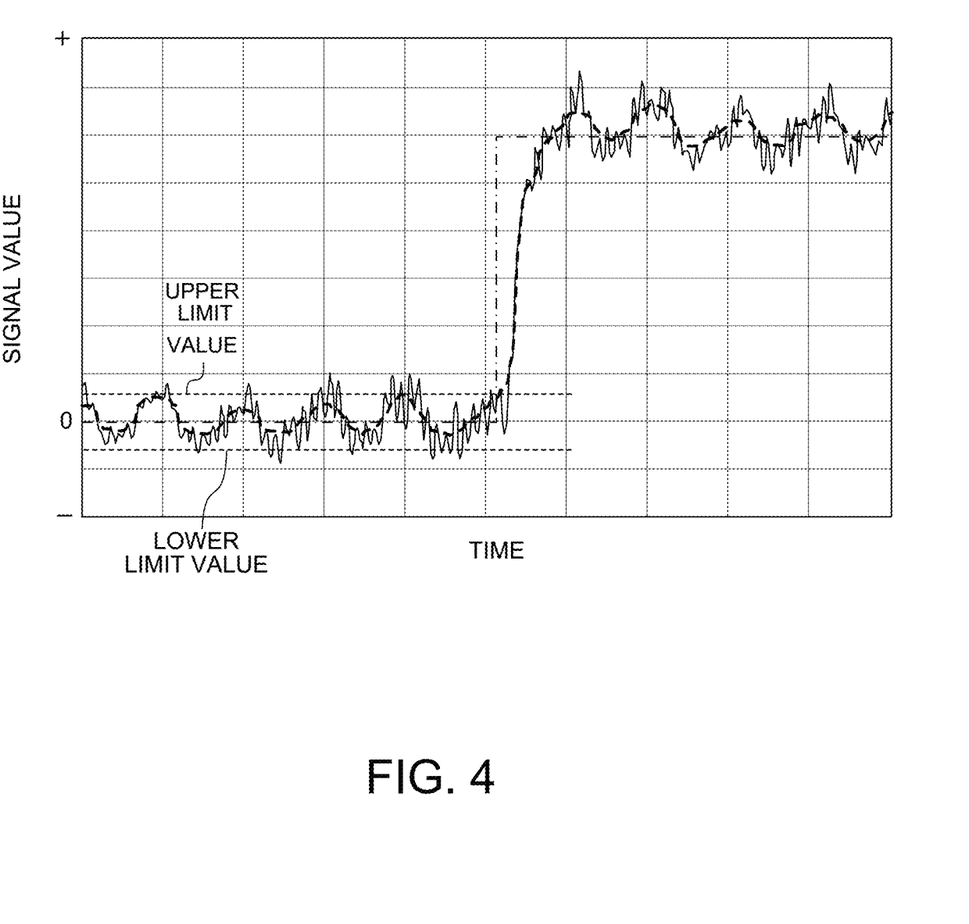
FIG. 4 is a diagram for explaining the effect of median filter processing.

FIG. 4 is a diagram for explaining the effect of median filter processing in Steps ST3 to ST5. Similarly to FIG. 8, FIG. 4 shows an example of reference data (refer to a thin solid line) outputted from the measuring instrument when a step-shaped reference signal (refer to a thin one dot chain line) is inputted to a reference signal channel of the measuring instrument. In FIG. 4, the filtered data obtained by performing the processing of Steps ST3 to ST5 on the reference data indicated by the thin solid line is indicated by the thick broken line.

As shown by thin solid lines in FIG. 4, the first to fifth reference data outputted from the first to fifth measuring instruments include harmonic noise. Therefore, as shown in Steps ST3 to ST5, by adjusting the time width (2K+1) of the median filter processing so that the signal value included in the steady section falls within a predetermined range between the positive upper limit value and the negative lower limit value centered on the value 0, the variation of the signal value in the steady section can be reduced. As is apparent from the comparison between FIG. 4 and FIG. 8, by generating filtered data by performing median filtering on the reference data in the present invention, it is possible to generate filtered data without causing delay to the original reference data while removing harmonic noise.

Referring back to FIG. 3, in Step ST6, the data analysis apparatus calculates rising timing information from each of the first to fifth filtered data calculated in Step ST4, and advances to Step ST7. Here, the rising timing information is information on a timing at which a signal value rises in each filtered data.

Figure 5:
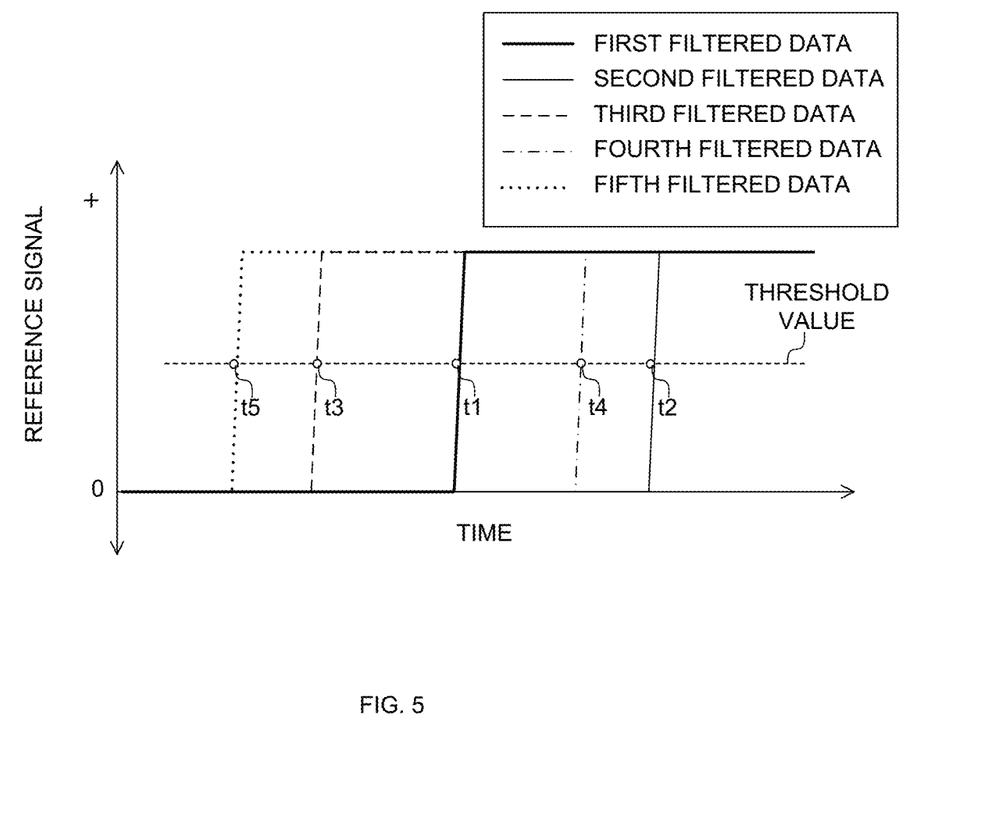
FIG. 5 is an example of first to fifth filtered data plotted on the same time axis.

FIG. 5 is an example of first to fifth filtered data plotted on the same time axis. For easy understanding, in the example shown in FIG. 5, harmonic noise included in each filtered data is not shown. As described above, since the first to fifth measuring instruments are not operated in synchronization, the rising timings of the signal values in the filtered data are not uniform.

In Step ST6, the data analysis apparatus calculates, as rising timing information, a first rising time t1, a second rising time t2, a third rising time t3, a fourth rising time t4, and a fifth rising time t5, which are times when the signal value in the first, second, third, fourth, and fifth filtered data sets exceed a threshold value indicated by a broken line in FIG. 5. Accordingly, in the example shown in FIG. 5, the second reference data and the first reference data can be synchronized by advancing the second reference data by time (t2−t1), the third reference data and the first reference data can be synchronized by delaying the third reference data by time (t1−t3), the fourth reference data and the first reference data can be synchronized by advancing the fourth reference data by time (t4−t1), and the fifth reference data and the first reference data can be synchronized by delaying the fifth reference by time (t1−t5).

Referring back to FIG. 3, in Step ST7, the data analysis apparatus synchronizes the first to fifth measurement data acquired in Step ST1 based on the first to fifth rising times calculated in Step ST6. As described above, since the first to fifth reference data are synchronized with the first to fifth measurement data, respectively, the first to fifth measurement data can be synchronized by using the first to fifth rising times.

Next, in Step ST8, the data analysis apparatus evaluates the performance of the electric vehicle by performing a predetermined arithmetic operation using the first to fifth measurement data synchronized in Step ST7.

According to the measurement data synchronization method (Steps ST1 to ST7 in FIG. 3) and the test method (Steps ST1 to ST8 in FIG. 3) of the present embodiment, the following advantageous effects are obtained.

(1) The embodiment of the present invention is configured to acquire the first to fifth reference data, which is time series data outputted from each measuring instrument, when a reference signal including a steady section and a rising section is simultaneously inputted to the first to fifth measuring instruments; generate the first to fifth filtered data by performing median filtering processing on the first to fifth reference data; calculate the first to fifth rising times from each of the first to fifth filtered data; and synchronize the first to fifth measurement data outputted from each of the first to fifth measuring instruments based on the first to fifth rising time. In particular, in the present embodiment, it is possible to remove high-frequency noise without causing delay in rising of a signal included in each reference data by performing median filtering processing on each reference data. Therefore, according to the present embodiment, since the first to fifth rising times can be accurately acquired by using the first to fifth filtered data generated through the median filter processing, it is possible to synchronize the first to fifth measurement data outputted from the first to fifth measuring instruments accurately.

(2) According to the embodiment of the present invention, it is possible to appropriately remove sudden noise such as impulse noise without causing delay in rising of the signal value by adjusting the time width in the median filtering processing so that the signal value included in the steady section of the first to fifth filtered data falls within the predetermined range over the evaluation time, whereby it is possible to accurately synchronize the first to fifth measurement data.

(3) In the embodiment of the present invention, a signal that changes in a ramp shape in a rising section is used as a reference signal, and the first to fifth reference data are subjected to differential processing and then subjected to median filter processing to generate the first to fifth filtered data. As a result, the offset components included in the first to fifth measurement data can be removed without causing a delay in rising of the first to fifth measurement data of the first to fifth measuring instruments, whereby it is possible to synchronize the first to fifth measurement data accurately.

(4) According to the embodiment of the present invention, it is possible to obtain the rising time by a simple arithmetic operation by obtaining a time when the signal value in the first to fifth filtered data exceeds a predetermined threshold value as a rising time.

(5) The embodiment of the present invention is configured to acquire reference data, which is time series data outputted from each measuring instrument, when a reference signal including a steady section and a rising section is simultaneously inputted to a reference signal channel of each of the plurality of measuring instruments, and measurement data, which is time series data outputted from each measuring instrument, when a signal correlated with a state of the test object is inputted to each measuring channel of the plurality of measuring instruments. Further, the embodiment of the present invention is configured to generate a plurality of pieces of filtered data by performing median filtering processing on each of a plurality of pieces of the reference data; acquire rising timing information from each of the plurality of pieces of filtered data; synchronize a plurality of pieces of the measurement data based on a plurality of pieces of the rising timing information; and evaluate a performance of the test object based on the plurality of pieces of synchronized measurement data. In particular, according to the embodiment of the present invention, it is possible to remove high-frequency noise without causing delay in rising of a signal included in the reference data by performing median filtering processing on each piece of reference data. Therefore, according to the embodiment of the present invention, since the rising timing information can be acquired accurately by using the filtered data generated through the median filter processing, it is possible to synchronize the measurement data outputted from each measuring instrument accurately, whereby it is possible to evaluate the performance of the test object accurately.

Second Embodiment

Next, a second embodiment of the present invention will be described in detail with reference to the drawings. The present embodiment is different from the first embodiment in the procedure of processing in the data analysis apparatus.

Figure 6:
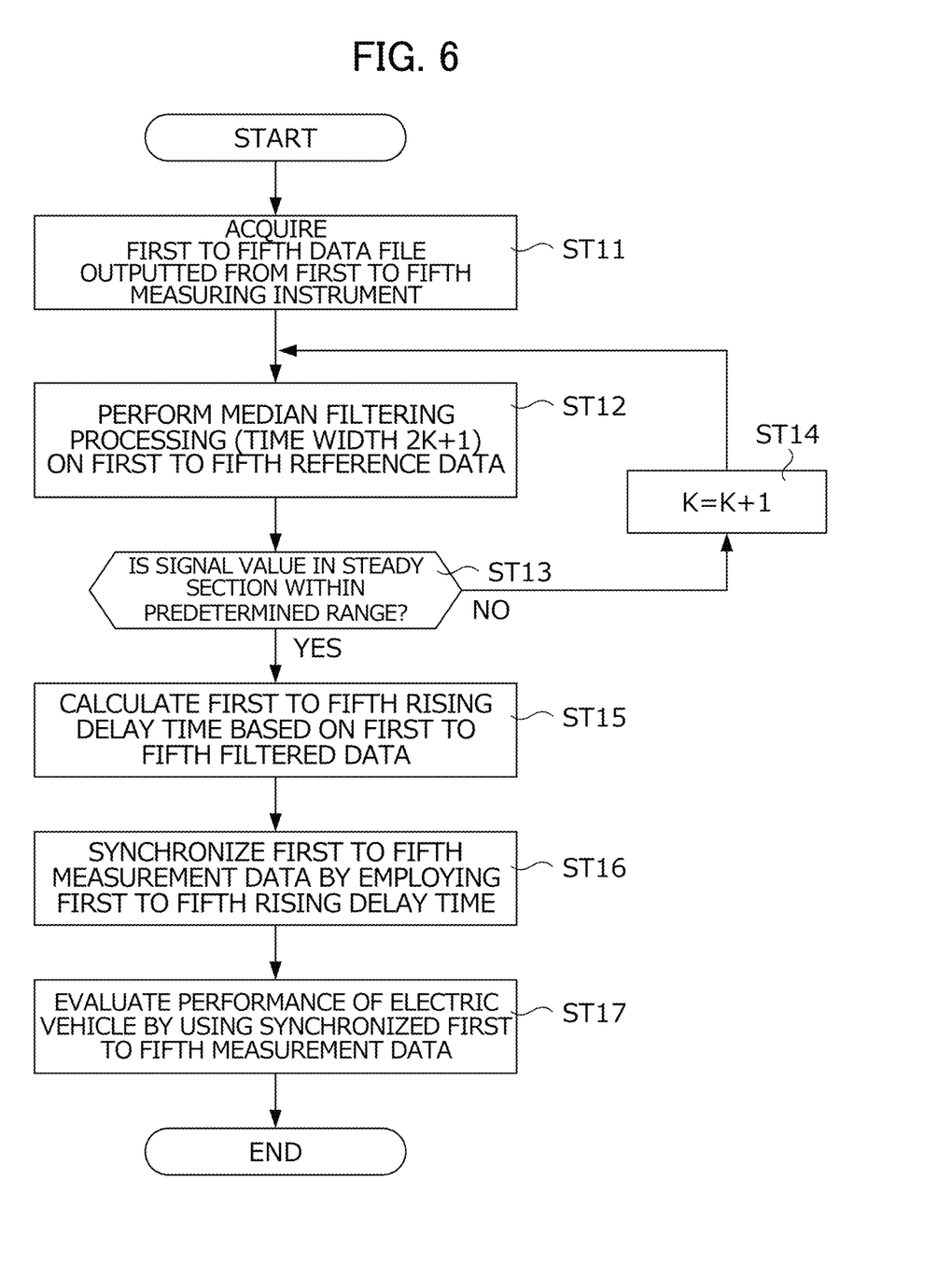
FIG. 6 is a flowchart showing a specific procedure of a measurement data synchronization method and a test method according to a second embodiment of the present invention.

FIG. 6 is a flowchart showing a specific procedure of a measurement data synchronization method and a test method according to the present embodiment. Since Steps ST11 and ST17 in FIG. 6 are the same as Steps ST1 and ST8 in FIG. 3, a detailed description thereof is omitted. In the following description, as shown in FIG. 2B, a case will be described where a signal that changes in a ramp shape in a rising section is used as a reference signal.

In Step ST12, the data analysis apparatus generates the first to fifth filtered data by performing the median filtering processing described with reference to equation (1) on the first to fifth reference data acquired in Step ST11, and then advances to Step ST13.

Next, in Step ST13, the data analysis apparatus determines whether or not the signal value included in the steady section of the first to fifth filtered data generated under the predetermined time width (2K+1) in Step ST12 falls within a range (see FIG. 4 described above) between the positive upper limit value and the negative lower limit value centered on the value 0 over a predetermined evaluation time. When the determination result in Step ST13 is NO, the data analysis apparatus increases the time width in the median filtering processing by counting up the value of the integer K (Step ST14), and then returns to Step ST12. When the determination result in Step ST13 is YES, the data analysis apparatus advances to Step ST15. That is, the present embodiment is different from the first embodiment in that median filtering is performed on the first to fifth reference data without performing differentiation to generate first to fifth filtered data.

Next, in Step ST15, the data analysis apparatus calculates rising timing information from each of the first to fifth filtered data calculated in Step ST13, and advances to Step ST16. More specifically, the data analysis apparatus calculates a delay time of a rising portion with respect to each predetermined reference from the first to fifth filtered data as rising timing information. Hereinafter, the delay times of the rising portions in the first to fifth filtered data are referred to as first to fifth delay times, respectively.

Figure 7:
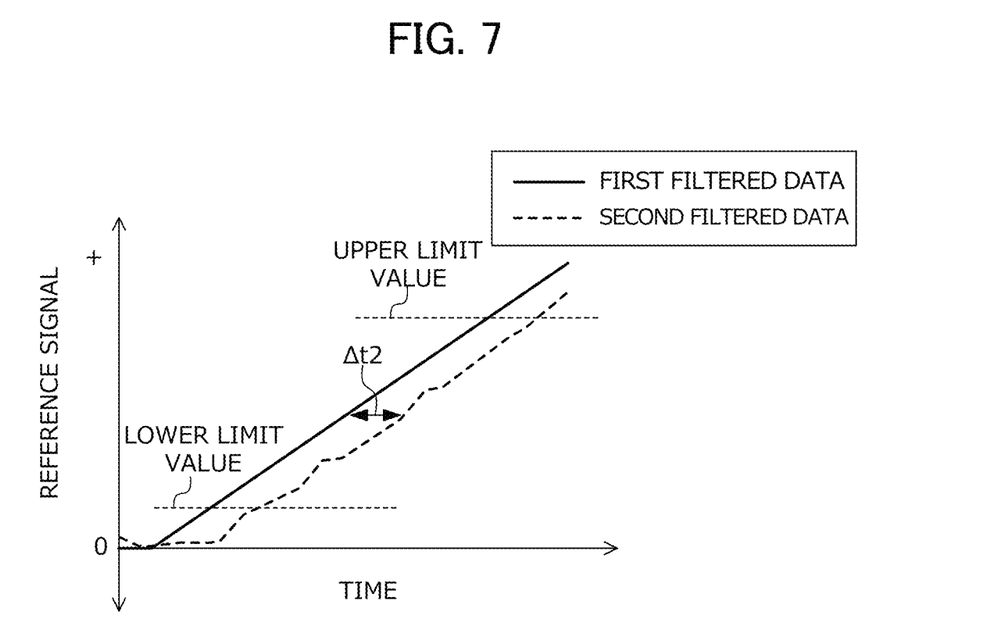
FIG. 7 is a diagram for explaining a procedure for calculating a delay time of a rising portion of first and second filtered data.

FIG. 7 is a diagram for explaining a procedure for calculating delay times $\Delta t1$ and $\Delta t2$ at rising portions of first and second filtered data. Hereinafter, a case where the first filtered data is used as a reference, that is, a case where the first delay time $\Delta t1$ is set to 0 will be described.

First, the data analysis apparatus extracts a signal value (in the example of FIG. 7, a signal value included between a lower limit value set to a value slightly larger than 0 and an upper limit value set to a value larger than the lower limit value) in a rising section from each filtered data. Next, the data analysis apparatus approximates the function form in the rising section of each filtered data by a linear function characterized by two coefficients (slope and intercept), and calculates the slope and intercept of each linear function by a least squares method using a plurality of extracted signal values. The following equations (2-1) and (2-2) show an example in which the signal values (Y1, Y2) of the rising sections of the first and second filtered data are approximated as a linear function of the time (X1i, X2i). In the following equations (2-1) and (2-2), coefficients (a1, a2) are slopes, and coefficients (b1, b2) are intercepts.

$$Y1 = a1 \cdot X1i + b1 \quad (2\text{-}1)$$

$$Y2 = a2 \cdot X2i + b2 \quad (2\text{-}2)$$

Next, the data analysis apparatus calculates a delay time of a rising portion with respect to a predetermined reference (the first filtered data in the present embodiment) by using the slope and intercept calculated from each filtered data. More specifically, when the first filtered data is used as a reference, the second delay time Δt2 is calculated by the following equation (3) using the previously calculated slope (a1, a2) and intercept (b1, b2). In the following expression (3), although it is assumed that the slope (a2) of the linear function in the rising section of the second filtered data is equal to the slope (a1) of the linear function in the rising section of the first filtered data, the present invention is not limited thereto. For example, the slope of the linear function in the rising section of each filtered data may be the average value of the slopes of each filtered data calculated by the least squares method as described above.

$$\Delta t2 = (b2 - b1)/a1 \quad (3)$$

Referring back to FIG. 6, in Step ST16, the data analysis apparatus synchronizes the first to fifth measurement data acquired in Step ST11 based on the first to fifth delay times calculated in Step ST15. As described above, since the first to fifth reference data are synchronized with the first to fifth measurement data, respectively, the first to fifth measurement data can be synchronized by using the first to fifth delay times. That is, when the first reference data is used as a reference (when the first delay time is 0), the first to fifth measurement data can be synchronized by advancing the second to fifth measurement data by the second to fifth delay times, respectively.

According to the measurement data synchronization method (Steps ST11 to ST16 in FIG. 6) and the test method (Steps ST11 to ST17 in FIG. 6), the following advantageous effects are obtained.

(6) In the embodiment of the present invention, a signal that changes in a ramp manner in a rising section is used as a reference signal, a slope and an intercept of a linear function generated based on a plurality of signal values included in a rising section of the filtered data are calculated, and a delay time of a rising section of the filtered data is calculated based on the slope and the intercept. According to the embodiment of the present invention, it is possible to synchronize the time series data of each measuring instrument more accurately by using the delay time of the rising portion calculated in this manner.

Although the embodiments of the present invention have been described above, the present invention is not limited thereto. The configuration of the detailed parts may be appropriately changed within the scope of the present invention.

For example, in the above embodiment, a case where the reference signal generated by the reference signal generation device 38 is inputted to each of the measuring instruments 31 to 35 has been described; however, the present invention is not limited thereto. For example, a vehicle speed detection signal or a vehicle speed command signal outputted from a driver's aid may be inputted to each of the measuring instruments 31 to 35 as a reference signal.

EXPLANATION OF REFERENCE NUMERALS

S test system
V electric vehicle (test object)
1 chassis dynamometer system
3 measuring instrument group
31 first measuring device
31d first data file
32 second measuring device
32d second data file
33 third measuring device
33d third data file
34 fourth measuring device
34d fourth data file
35 fifth measuring device
35d fifth data file
38 reference signal generation device
5 data analysis apparatus (computer)

The invention claimed is:

1. A test method for evaluating a performance of a test object by processing time series data outputted from a plurality of measuring instruments by a computer, the test method comprising:
acquiring reference data, which is time series data outputted from each measuring instrument, when a reference signal including a steady section and a rising section is simultaneously inputted to a reference signal channel of each of the plurality of measuring instruments, and measurement data, which is time series data outputted from each measuring instrument, when a signal correlated with a state of the test object is inputted to each measuring channel of the plurality of measuring instruments;
generating a plurality of pieces of filtered data by performing median filtering processing for extracting a median value within a predetermined time width on each of the plurality of pieces of reference data;
acquiring rising timing information from each of the plurality of pieces of filtered data;
synchronizing a plurality of pieces of the measurement data so that the rising timings of signal values in a plurality of pieces of filtered data are aligned based on a plurality of pieces of the rising timing information; and
evaluating a performance of the test object based on the plurality of pieces of synchronized measurement data.

2. The test method according to claim 1, wherein generating the plurality of pieces of filtered data includes adjusting the time width so that a signal value included in the steady section of the plurality of pieces of filtered data falls within a predetermined range over an evaluation time.

3. The test method according to claim 1, wherein acquiring the reference data includes employing a signal that changes in a ramp shape in the rising section as the reference signal, and generating the plurality of pieces of filtered data includes performing the median filtering processing after performing differentiation processing on the reference data.

4. The test method according to claim 1, wherein acquiring the rising timing information includes acquiring a time when a signal value in each of the plurality of pieces of filtered data exceeds a predetermined threshold, as a rising time.

5. The test method according to claim 1, wherein
acquiring the reference data includes employing a signal that changes in a ramp shape in the rising section as the reference signal, and
acquiring the rising timing information includes calculating a slope and an intercept of a linear function generated based on a plurality of signal values included in the rising section of the plurality of pieces of filtered data, and calculating a delay time of a rising portion of each of the plurality of pieces of filtered data based on the slope and the intercept.

* * * * *